United States Patent [19]

Smrt

[11] 4,055,146
[45] Oct. 25, 1977

[54] AUTOMATIC FEEDING APPARATUS

[75] Inventor: Thomas J. Smrt, Bartlett, Ill.

[73] Assignee: Fox Valley Marking Systems, Inc., Cary, Ill.

[21] Appl. No.: 718,684

[22] Filed: Aug. 30, 1976

[51] Int. Cl.² ............................................. A01K 61/02
[52] U.S. Cl. .................................... 119/51.11; 60/528
[58] Field of Search ................ 119/51.11, 51 R, 56 R; 222/54; 60/527, 528, 529

[56] References Cited

U.S. PATENT DOCUMENTS

| 2,572,162 | 10/1951 | Koonz | 60/529 |
| 2,722,613 | 11/1955 | Culbertson | 60/528 |
| 2,793,791 | 5/1957 | Clark | 119/56 R X |
| 3,142,149 | 7/1964 | Hays | 60/528 |
| 3,421,479 | 1/1969 | Fleming | 119/51 R X |
| 3,604,601 | 9/1971 | Boling | 119/51 R X |

Primary Examiner—Hugh R. Chamblee

[57] ABSTRACT

An automatic feeding apparatus periodically feeds a metered amount of material such as fish food. The material is stored in a hopper and is fed by a rotary valve which is rotated by a ratchet wheel. The rachet wheel is intermittently driven by a reciprocable actuator which is engageable by a thermostatic metal strip. The thermostatic metal strip moves back and forth between first and second positions as it is heated and cools to reciprocate the actuator. The metal strip is connected to an electrical terminal and contacts another terminal in one of its first and second positions to close an electrical circuit which includes a resistor for heating the strip. When the electrical circuit is closed, the strip is heated until it moves to its other position to open the circuit, and the strip then cools until it moves to close the circuit again. The actuator is reciprocated during each heating and cooling cycle of the strip to advance the ratchet wheel.

7 Claims, 7 Drawing Figures

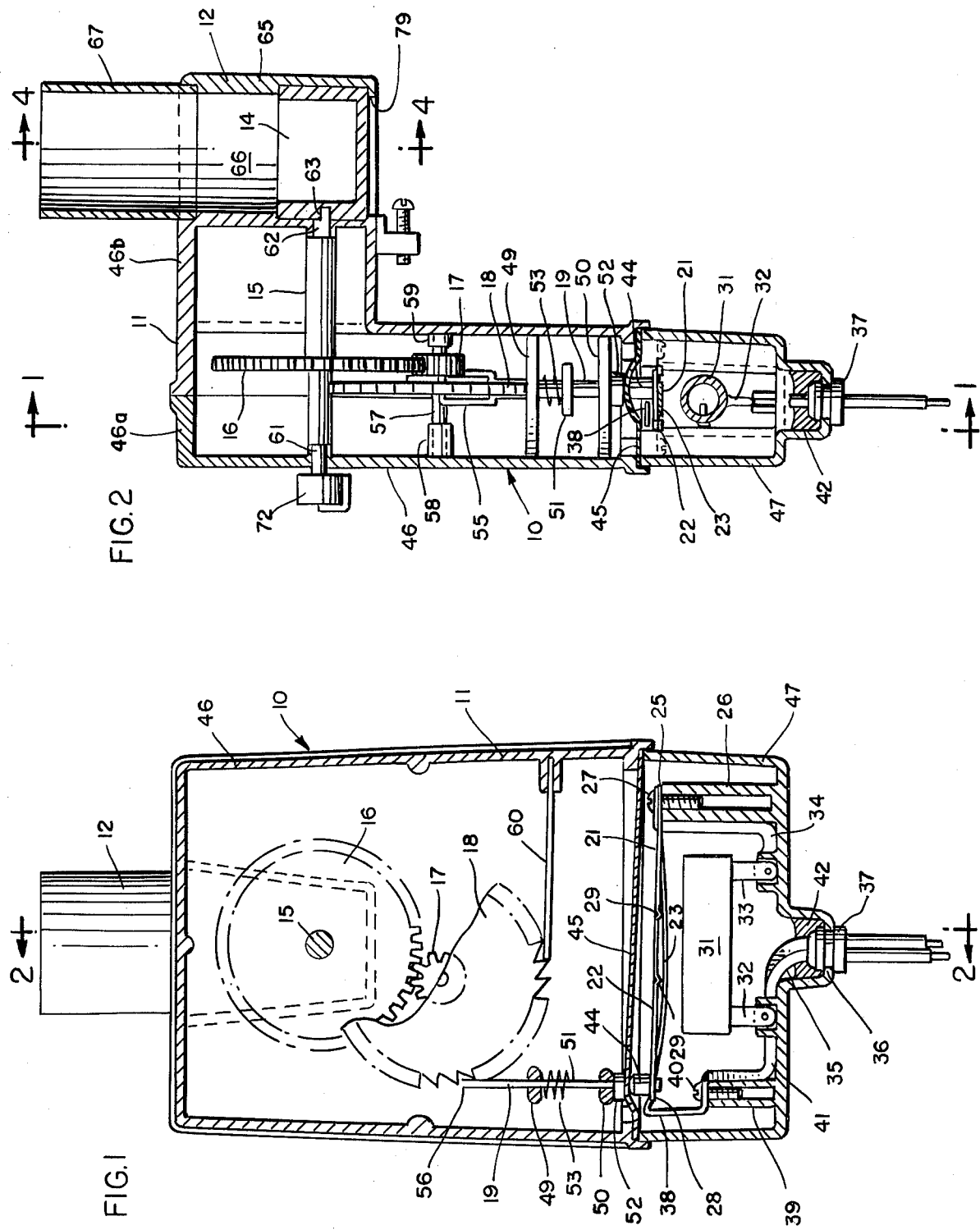

AUTOMATIC FEEDING APPARATUS

BACKGROUND AND SUMMARY

This invention relates to a feeding apparatus, and, more particularly, to a feeding apparatus which periodically feeds a metered amount of material.

The invention will be explained in conjunction with a fish feeding apparatus. Fish are generally fed only once every 24 hours, and the amount of food is desirably fairly accurately controlled. Further, it is desirable to feed the fish at approximately the same time each day.

Manual feeding of fish necessarily involves certain disadvantages. The amount of food and the time of feeding almost inevitably varies from day to day, and occasions arise when the fish are not fed at all, e.g., due to normal human forgetfulness, vacations, etc.

The invention insures the dispensing of a constant, measured amount of food at the same time each day. The food is measured and dispensed by a rotary valve, and the valve is rotated once each day by a ratchet wheel which is intermittently driven by an actuator which is reciprocated by a thermostatic bimetallic strip. When the bimetallic strip is cool, it closes an electrical circuit which includes an electrical resistor. The resistor heats the bimetallic strip and causes the strip to move to open the circuit. When the circuit is opened, the resistor and the strip cool until the strip moves back to close the circuit, and the heating process begins again. A gear train may be interposed between the ratchet wheel and the rotary valve, and the gear ratio and the resistor are selected so that the rotary valve is rotated once during the desired period, e.g., 24 hours.

DESCRIPTION OF THE DRAWING

The invention will be explained in conjunction with an illustrative embodiment shown in the accompanying drawing, in which—

FIG. 1 is an elevational sectional view of a feeding apparatus formed in accordance with the invention;

FIG. 2 is a sectional view taken along the line 2—2 of FIG. 1;

DESCRIPTION OF SPECIFIC EMBODIMENT

Figure 5:
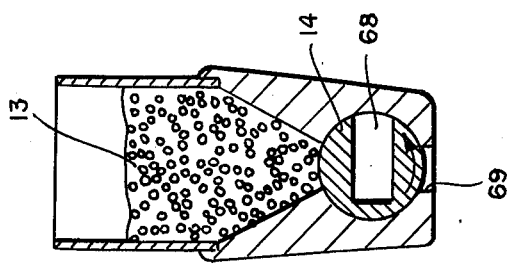
FIG. 5 is a sectional view similar to FIG. 4 showing the rotary valve moved one quarter of a cycle from the feeding position.
Figure 7:
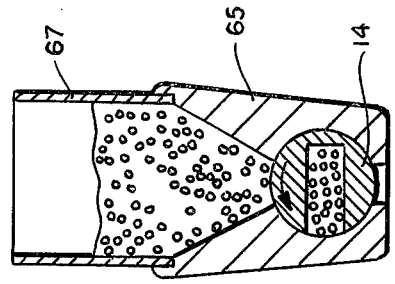
FIG. 7 is a sectional view similar to FIG. 4 showing the rotary valve moved one quarter of a cycle from the loading position.
Figure 4:
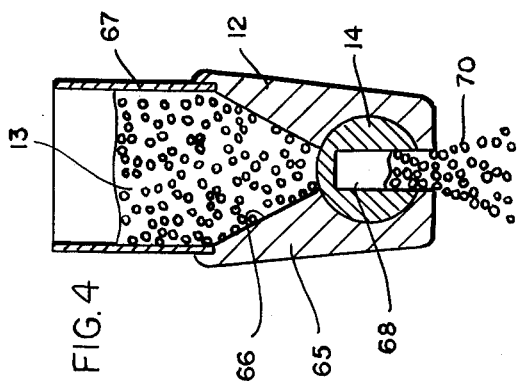
FIG. 4 is a sectional view taken along the line 4—4 showing the rotary valve in the dispensing position.
Figure 6:
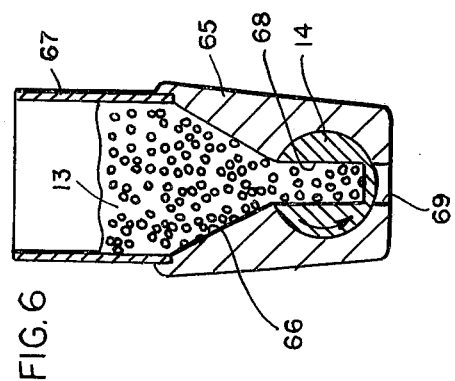
FIG. 6 is a sectional view similar to FIG. 4 showing the rotary valve in the loading position.

As stated previously, the specific embodiment of the invention which will be explained is a fish feeder. The numeral 10 designates generally a fish feeder which includes a plastic casing or frame 11 and a hopper 12 mounted on the frame. The hopper may be filled with fish food 13 (FIGS. 4–7), and the food is periodically dispensed by a rotary valve 14 mounted below the food chamber of the hopper.

The rotary valve is rotated by a shaft 15 (FIG. 2) which is driven by a gear wheel 16, and the gear wheel 16 is driven by a spur gear 17 which is mounted on a ratchet wheel 18. The ratchet wheel is intermittently rotated by a reciprocable actuating rod 19.

The actuating rod 19 is periodically reciprocated by a strip 21 which is made of thermostatic metal, i.e., metal which moves from one position to another as it is heated and cools. Generally such strips are bimetallic strips which are prepared by laminating two pieces of metal, each metal having a different coefficient of thermal expansion. Since such strips are well known, a detailed description thereof is unnecessary.

The particular thermostatic metal strip illustrated in the drawing has an elongated rectangular outer periphery which is provided by a pair of spaced-apart outer strips 22 (FIG. 2). A central strip 23 is positioned between the outer strips, and the ends of the strips are joined together. The outer and central strips can be formed by punching or drawing a flat sheet to form the strips, and the entire thermostatic strip is formed from two laminated layers of metal having different coefficients of thermal expansion.

One end 25 of the thermostatic metal strip is secured to a post 26 of the casing by a screw 27, and the other end 28 is unsupported. The central strip 23 is bowed downwardly from the substantially straight outer strips as shown in FIGS. 1 and 2, which illustrate the position which the thermostatic metal strip occupies when it is relatively cool, e.g., at room temperature. The length of the outer strips is reduced to accommodate the bowing of the central strip by forming U-curves 29 in the outer strips. When the thermostatic metal strip is heated, it eventually moves from the cool position of FIG. 1 to the heated position shown in FIG. 3, in which the outer strips 22 curve downwardly from the fixed end 25 and the central strip 23 is bowed upwardly from the outer strips. The bowed configuration of the central strip provides a snap action which snaps the free end 28 downwardly when the thermostatic strip is heated sufficiently to reverse the curvature of the central strip and to move it over center with respect to the outer strips. Similarly, when the thermostatic metal strip is allowed to cool, the free end will eventually snap upwardly to the FIG. 1 position when the central strip moves over center and bows downwardly.

The thermostatic strip is periodically heated by an electrical resistor 31 which is supported within the casing by a pair of terminals 32 and 33. A wire 34 connects the terminal 33 to the screw 27 and the fixed end 25 of the thermostatic metal strip, and a wire 35, which extends through an opening 36 in the casing, connects the terminal 32 to an electrical power source. If desired, the wire 35 can pass through a resilient strain relief bushing or grommet 37 positioned in the opening 36.

A C-shaped contact 38 is secured to a support post 39 on the casing by a screw 40, and the contact is connected to the power source by a wire 41 which also passes through the bushing 37. The area through which the wires 35 and 41 pass through the casing is potted or sealed by suitable sealing material 42, such as silicone rubber.

The thermostatic metal strip acts essentially as a snap action switch blade which opens and closes an electrical circuit between a pair of terminals provided by the contact 38 and the wire 34. The fixed end of the strip is connected to the wire 34, and the free end 28 is movable between a closed position shown in FIG. 1 in which it engages the contact 38 and an open position shown in FIG. 3 in which it does not engage the contact and the circuit is open.

Figure 3:
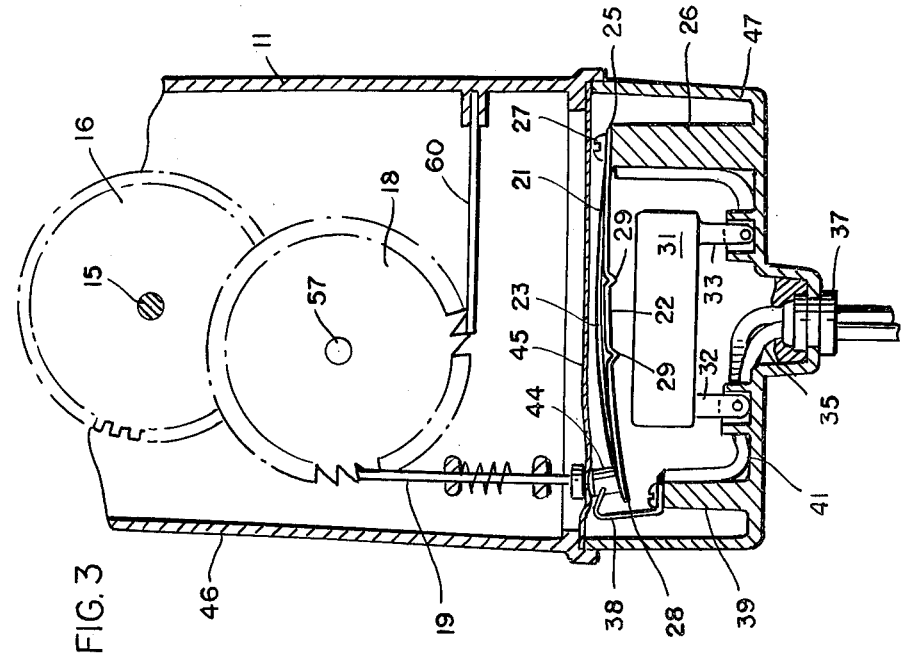
FIG. 3 is a fragmentary sectional view similar to FIG. 1 showing the termostatic strip and the actuator in another position.

A cylindrical pusher 44, which may be formed from insulating material, is mounted on the free end of the thermostatic strip laterally outwardly of the contact 38 (see FIG. 2) for pushing the actuator 19 upwardly as the free end of the thermostatic strip moves from its FIG. 3 position to its FIG. 1 position. A flexible diaphragm 45 extends between the pusher and the actuator and seals the lower portion of the casing which encloses the electrical elements. The casing is advantageously formed from an upper portion 46 and a bottom portion 47, and the diaphragm is secured between the two portions. The upper portion 46 may be formed from front and rear halves 46a and 46b (see FIG. 2) which are adhesively or otherwise secured together.

The actuator 19 is slidably supported for vertical reciprocating movement by a pair of vertically spaced cross bars 49 and 50, and the actuator includes a pair of laterally outwardly extending stop members 51 and 52 which are engageable with the cross bar 50 to limit the movement of the actuator. The actuator is biased downwardly by a coil spring 53 which is positioned between the stop member 51 and the upper cross bar 49.

The upper end of the actuator is provided with an enlarged rectangular loop 55 (FIG. 2), and the upper end 56 (FIG. 1) of the loop is engageable with the teeth of the ratchet wheel 18 as the actuator moves upwardly. The bottom edge of the upper end 56 is inclined so that the actuator can move downwardly without rotating the ratchet wheel in a counterclockwise direction.

The ratchet wheel 18 and spur gear 17 are mounted for rotation on a shaft 57 (FIG. 2) which extends into trunnions 58 and 59 formed in the sections 46a and 46b of the upper casing. Counterclockwise rotation of the ratchet wheel is restrained by an indexing arm 60 (FIG. 1) which is mounted on the upper casing and which is engageable with the teeth of the ratchet wheel.

The shaft 15 of the gear 16 includes a pair of reduced end portions 61 and 62 (FIG. 2) which extend through openings in the casing and are rotatably supported thereby. The reduced end portion 62 terminates in a semi-cylindrical projection 63 which extends into a correspondingly shaped opening in the rotary valve 14 for rotating the rotary valve.

The hopper 12 includes a housing 65 which provides a hopper chamber 66, and the rotary valve 14 is rotatably mounted within the housing below the hopper chamber. An extension sleeve 67 is supported by the housing and extends upwardly therefrom to increase the capacity of the hopper.

The rotary valve is provided with a feed chamber 68 (FIG. 4) which is sized to accommodate the desired volume of material which is desired to be fed during one cycle of the rotary valve. The rotary valve is rotatable from a filling position illustrated in FIG. 6 in which the chamber 68 thereof communicates with the hopper chamber 66, and a dispensing poisition illustrated in FIG. 4 in which the chamber is aligned with an opening 69 in the bottom of the hopper housing so that the metered amount 70 of material falls through the opening.

It is believed that the operation of the device is apparent from the foregoing description. When the power source is first turned on, the thermostatic metal strip 21 is in the cool position illustrated in FIG. 1. In this position, the thermostatic strip engages the contact 38 and closes the electrical circuit. The current causes the resistor to heat up, which increases the temperature of the thermostatic strip. Eventually the temperature of the strip will be raised sufficiently to cause the curvature of the central strip 23 to reverse, thereby causing the thermostatic strip to snap downwardly to its heated position illustrated in FIG. 3. This opens the electrical circuit, and the resistor begins to cool.

When the thermostatic strip moves downwardly, the actuator 19 is moved downwardly by the spring 53. The force exerted by the spring is sufficient to move the actuator 19 downwardly after the thermostatic switch has snapped to its down position, but the force of the spring is not sufficient to force the thermostatic strip downwardly. The downward movement of the actuator 19 is substantially uninhibited by the diaphragm 45, which is formed of material with substantial flexibility. The ratchet wheel 18 is prevented from rotating counterclockwise when the actuator moves downwardly by the indexing arm 60.

After the electrical circuit is opened, the thermostatic strip will eventually cool enough so that the central strip 23 will again reverse itself and cause the free end 28 of the thermostatic switch to snap upwardly to its FIG. 1 position. The upward movement of the thermostatic strip and the pusher 44 pushes the actuator 19 upwardly, thereby causing the ratchet wheel to rotate clockwise. Clockwise rotation of the ratchet wheel 18 causes clockwise rotation of the spur gear 17 and counterclockwise rotation of the gear wheel 16 and rotary valve 14.

The opening and closing cycle of the thermostatic switch will continually repeat itself, and the ratchet wheel 18 and the rotary valve will thereby be intermittently rotated. During one complete rotation of the rotary valve, the rotary valve will move from a filling position illustrated in FIG. 6, through a dispensing position illustrated in FIG. 4, and back to a filling position.

The rate of rotation of the rotary valve is a function of the ratio of the gears 16 and 17 and the resistor 31. In one particular embodiment of the invention I used a 750 ohm, 25 watt resistor, and this caused the thermostatic switch to cycle, i.e., move from its FIG. 1 position to its FIG. 3 position and back to its FIG. 1 position, about every 10 minutes. The ratio of the gears 16 and 17 was then selected to cause the rotary valve to rotate once every 24 hours so that food would be dispensed once a day at the same time.

The rotary valve may be set to a desired position when operation of the device is initiated, or feeding may be manually advanced, by means of a knob 72 (FIG. 2) which is mounted on the shaft 15. The knob can be rotated counterclockwise without interference from the indexing arm 60 which is engageable with the ratchet wheel.

The volume of the metered amount of food which is dispensed during each cycle of the rotary valve by selecting a rotary valve with the appropriate sized chamber. This permits the apparatus to be adapted for use with different size aquariums and/or types of fish merely by inserting a different rotary valve.

In the embodiment illustrated and described the thermostatic strip pushes the actuator during the cooling phase of the thermostatic strip. However, the thermostatic strip and the actuator could be arranged so that the actuator was engaged by the thermostatic strip when the thermostatic strip was heated. Engagement of the actuator during the cooling phase of the thermostatic strip was chosen for two reasons. First, it was found that the force generated by the thermostatic strip while snapping from the heated position of FIG. 3 to the cooled position of FIG. 1 was approximately twice that of the force generated when the strip snaps from the FIG. 1 position to the FIG. 3 position. Second, by having the thermostatic strip engage the actuator during the cooling phase, a safety factor is added to the apparatus. If a jam occurs which would prevent reciprocation of the actuator, the thermostatic element would not be allowed to rise enough to engage the contact 38 to complete the electrical circuit, and operation of the apparatus would cease. If the thermostatic strip engages the contact, the thermostatic strip is free to accomplish its hot phase reversal when the strip is heated sufficiently, and the electrical portion of the apparatus would continue to operate normally without rotating the ratchet wheel and without excessive heat build up by the resistor due to its being heated continuously as would be the case if the thermostatic strip were prevented from disengaging itself from the contact.

While in the foregoing specification a detailed description of a specific embodiment of the invention was set forth for the purpose of illustration, it is to be understood that many of the details herein given may be varied considerably by those skilled in the art without departing from the spirit and scope of the invention.

I claim:

1. An automatic feeding apparatus comprising a frame, a hopper on the frame for holding material to be fed, valve means mounted on the frame below the hopper for feeding a discrete amount of material from the hopper, wheel means rotatably mounted on the frame for actuating the valve means, the wheel means including a ratchet wheel, an actuator reciprocably mounted on the frame and engageable with the ratchet wheel for intermittently rotating the ratchet wheel, a pair of electrical terminals adapted to be connected to a source of electric power, and a thermostatic metal strip connected to one of the terminals, the thermostatic metal strip being movable by thermal expansion and contraction between a first position in which the strip engages the other terminal and a second position in which the strip is out of contact with the other terminal, the strip completing a circuit between the terminals when the strip is in the first position whereby the strip is heated, the electric circuit being opened when the strip moves to the second position whereby the strips cools, the strip engaging and moving the actuator when the strip moves from one of its positions to the other of its positions whereby the ratchet wheel is rotated.

2. The apparatus of claim 1 including an electrical resistor positioned adjacent a thermstatic metal strip and connected in series with the terminals, the resistor heating the strip when the strip is in the first position.

3. The apparatus of claim 1 in which the strip engages and moves the actuator when the strip moves from its second position to its first position.

4. The apparatus of claim 1 in which the valve means comprises a rotary valve which is rotatable by the wheel means.

5. The apparatus of claim 1 in which the wheel means includes a gear wheel rotatably mounted on the frame, the ratchet wheel including a gear meshing with the gear wheel for rotating the gear wheel as the ratchet wheel rotates.

6. The apparatus of claim 1 in which the valve means below the hopper is actuated periodically with a predetermined time period.

7. The apparatus of claim 1 including a flexible diaphragm on the frame between the thermostatic metal strip and the actuator.

* * * * *